Figure 1:
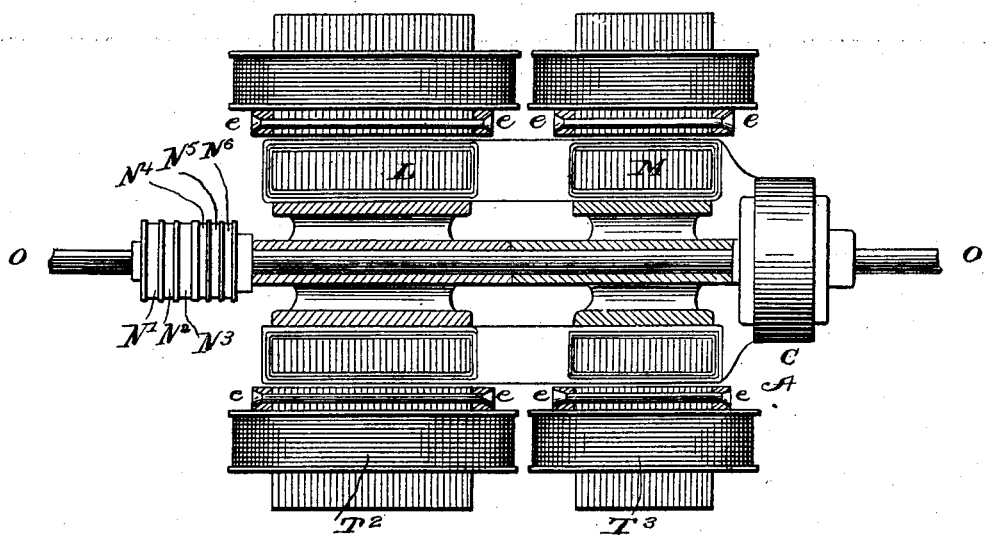

No. 653,088. Patented July 3, 1900.
M. HUTIN & M. LEBLANC.
APPARATUS FOR EXCITING ALTERNATING CURRENT DYNAMO ELECTRIC MACHINES.
(Application filed Apr. 13, 1899.)

(No Model.) 4 Sheets—Sheet 1.

Witnesses:
J. M. Fowler Jr.
F. T. Chapman

Inventors:
Maurice Hutin,
Maurice Leblanc,
By Lyons & Bissing
Attorneys.

No. 653,088. Patented July 3, 1900.
M. HUTIN & M. LEBLANC.
APPARATUS FOR EXCITING ALTERNATING CURRENT DYNAMO ELECTRIC MACHINES.
(Application filed Apr. 13, 1899.)

(No Model.) 4 Sheets—Sheet 3.

No. 653,088. Patented July 3, 1900.
M. HUTIN & M. LEBLANC.
APPARATUS FOR EXCITING ALTERNATING CURRENT DYNAMO ELECTRIC MACHINES.
(Application filed Apr. 13, 1899.)
(No Model.) 4 Sheets—Sheet 4.
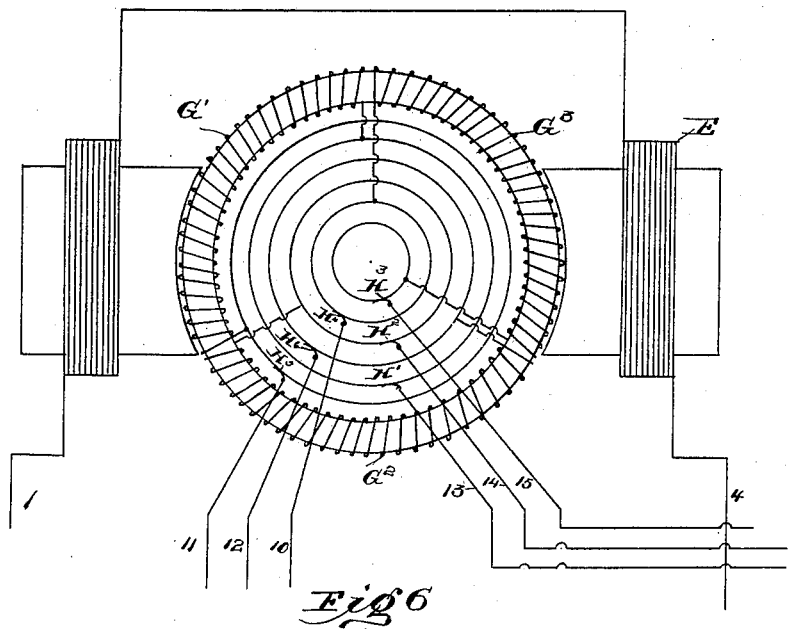
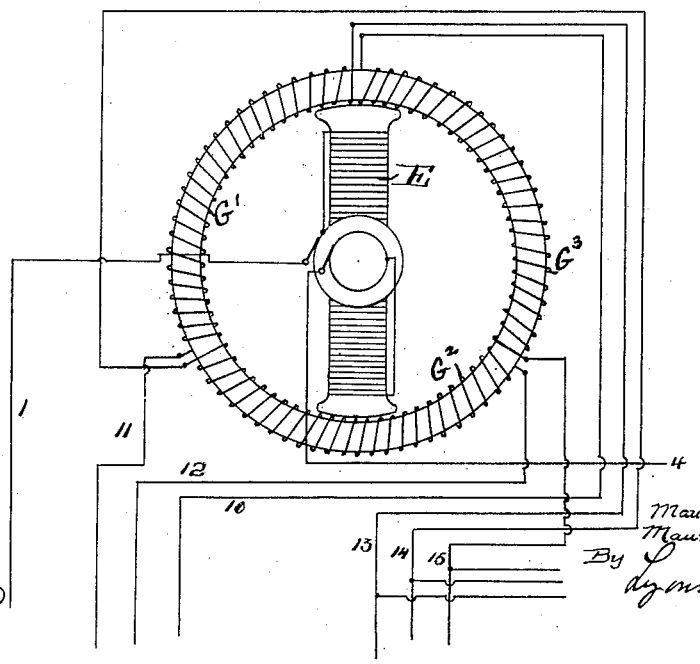

UNITED STATES PATENT OFFICE.

MAURICE HUTIN AND MAURICE LEBLANC, OF PARIS, FRANCE.

APPARATUS FOR EXCITING ALTERNATING-CURRENT DYNAMO-ELECTRIC MACHINES.

SPECIFICATION forming part of Letters Patent No. 653,088, dated July 3, 1900.

Application filed April 13, 1899. Serial No. 712,893. (No model.)

*To all whom it may concern:*

Be it known that we, MAURICE HUTIN and MAURICE LEBLANC, citizens of the Republic of France, and residents of Paris, France, have invented certain new and useful Improvements in Apparatus for Exciting Alternating-Current Dynamo-Electric Machines, of which the following is a specification.

The object of this invention is to improve upon the system of alternating-current excitation or regulation which has been patented to us under No. 630,233, dated August 1, 1899, and to which patent we hereby refer. In this prior patent there is an alternator consisting of a field and an armature. There is, furthermore, an exciter, which in the specific case shown comprises a movable field M, which is in shunt with the circuits of the exciter-armature, or, what is the same thing, in shunt with the network of circuits which the alternator supplies, and there is another movable field L, at right angles to the field first mentioned, the circuits of which are in series with the armature-circuits of the alternator. There is in addition an armature-circuit A on the exciter, which is wound about the two movable field-circuits and which has its successive sections tapped to a commutator C, as is common in continuous-current machines. The two movable field-circuits and the armature-circuit, which constitute a single mechanical structure, revolve within an exterior iron ring S, which merely acts to close the magnetic circuit of any magnetic flux which may be engendered. There are no true field-windings on this iron ring—that is to say, no winding producing a flux at the angle required for a true field. There is, however, a winding on this field-ring which in the patent is called a "compensating" winding T and which compensating winding can be no better described than by saying that it is, in effect, a negative armature-winding producing a flux at right angles to that which would be required in the case of a true field-winding and acting to compensate for or counteract the counter magnetomotive force due to armature reaction. The compensating winding T just referred to is mounted in series with the brushes D on the commutator, and these in turn are placed in series with the field-winding E of the alternator. When now the two movable field-circuits of the exciter are wound in accordance with the provisions of our prior patent just referred to, it is found, as is shown in the patent, that a perfect system of excitation and regulation is produced—that is, the current which is supplied from the armature-circuits of the alternator to the movable field-circuits of the exciter under the varying conditions of load and current lead and lag will cause this exciter, and through it the brushes resting on its commutator, to supply such currents to the alternator-field as will produce a mathematically-perfect regulation. Furthermore, as was fully shown in this patent, when a number of these alternators and exciters are used in the same network, having once been put in step therewith they will never again fall out of step. This is due to the fact that if a given alternator is running in synchronism with the system the brushes on the commutator of the exciter will supply continuous current to the alternator-field. If, on the other hand, the alternator is running at a departure from synchronism, then the brushes of the exciter will no longer supply continuous current, but will supply alternating current to the exciter-field of a frequency which exactly compensates for the departure from synchronism; but it was necessary in our prior patent that mechanical or electrical gearing be employed to compel the exciter to turn in synchronism with the alternator. Such electrical gearing as was suggested in the patent might be a synchronous motor. Thus if one supposes that the exciter and the alternator of the patent have the same number of poles it would be necessary to mount them both on the same axis, so that their mutual connections should always remain the same whatever be the condition of operation of the system. This solution, however, can only be applied in case the alternator has a feeble polarity and turns with a great velocity. It will not be practical if the alternator has small angular velocity, for in such case the exciter, turning with the same small velocity, would have to have unreasonably large dimensions. Should the number of poles in the exciter and alternator differ, in which case the angular velocity of these machines would differ, a train of gearing may be employed, as is indicated in the patent. This, however, is also somewhat inconvenient, especially when it is intended to supply the new exciter to an existing alternator, in which case there will be no provision for the establishment of this train of gearing. It is therefore manifestly advantageous to suppress all mechanical connection between the alternator and exciter and, if possible, to have the exciter keep in synchronism with the alternator of its own accord. This is the problem the solution of which forms the basis of the present invention.

As we have above indicated, a winding T is used on the exterior iron ring of the exciter of our previous patent, which generates a flux in a direction and of an amount necessary to neutralize the armature reaction. This fixed or compensating coil, which is in series with and is therefore traversed by the current issuing from the brushes which rest on the commutator of the exciter, produces a magnetizing force which is equal to but of opposite sign with that which the same current develops in traversing the movable circuit of the exciter branched between the contacts of its commutator. This may be stated in still another way by saying that the continuous or alternating current of low frequency which issues from the brushes of the exciter engenders no flux in the movable armature of the exciter. Manifestly this condition will only be fulfilled if the number of turns in the fixed or compensating coils of the exciter have definitely-defined values, and if the position which they occupy around the fixed ring of the exciter tends to produce a field not at right angles to it, but in the same direction as that produced by the armature. This was the condition aimed at and produced in our prior patent. We now suppose that these conditions no longer prevail and that the compensating coils of the exciter develop not only the flux which they have hitherto developed, but also a flux which will make an angle of ninety degrees therewith if the machine has two poles and an angle of $\frac{90}{n}$ if it has $2n$ poles—that is, we suppose that another circuit is added to the compensating circuit of the exciter of the patent and in series therewith, which, put in another way, means that we now employ a field-winding on the stationary ring of the exciter which develops, first, a flux in the same direction as but of opposite sign with that developed by the armature, thus compensating for armature reaction, and, second, a flux at right angles thereto, which is the true field flux tending to drive the armature. In these conditions the current coming from the brushes of the exciter will develop in the field of the exciter a flux which is constant and fixed in space if the currents are continuous, or a flux of constant intensity, but turning with the velocity of $\frac{\alpha}{n}$ if the currents are alternating and of a frequency $\alpha$ and if the machine has $2n$ poles. Assuming the exciter to turn synchronously with the alternator whose field-circuit it supplies, we find that in the first case the alternating currents which proceed from the alternator of this machine and which traverse the movable field-circuits of the exciter themselves develop a flux of constant intensity and fixed in space. In the second case they determine a flux of constant intensity, but turning in space with a velocity of $\frac{\alpha}{n}$. In either case, therefore, there will be produced a couple upon the axis of the exciter the amount of which depends upon the amount of the fluxes engendered by the fixed and moving circuits of the exciter and upon the angle which their directions make. The exciter when once synchronized will thus continue to turn in each of the two cases specified in the last paragraph with the same velocity as the alternator. The field-circuits of the alternator in the first case will be supplied with constant current and in the second case with alternating currents of low frequency. On the other hand, the movable field-circuits of the exciter will be supplied from the armature-circuits of the alternator with alternating current. The first case, in short, as was fully pointed out in the patent, is that in which the alternator acts as a synchronous machine. The second case is that in which the alternator acts as an asynchronous machine. The exciter may then be compared to a rotary transformer which receives alternating current of a definite frequency in its movable field-windings from the multiphase armature-circuits of the alternator and which supplies in turn either a continuous or another alternating current of low frequency from the brushes resting on its commutator to the alternator-field and of such an amount as to produce a perfect regulation.

It is quite clear, in order that the electromotive force developed between the commutator-brushes of the exciter may always remain proportional to the intensity of the resulting flux developed by the alternating currents coming from the armature of the alternator which traverse the movable field-circuits of the exciter, that the number of turns of the fixed field-circuit of the exciter, which has just been described, may be so small as not to overpower the movable field. If this new fixed field on the exciter, which both compensates for armature reaction and supplies the field-flux for driving the machine, is so strong as to overpower the effect of the movable field-circuits of the exciter, and thus makes the exciter act like an ordinary series-wound motor, it is evident that the effect of the two movable circuits of the exciter would be swamped. We have found that this exciter or rotary transformer excited as we have described enjoys a remarkable property, which we have discovered by calculation and have verified by experiment. We shall not attempt to give the mathematical formula in accordance with which this discovery is proved. They are too complex to be adapted for this purpose. We merely state that we have proved that whatever be the variation of the action of the exciter, and in consequence the variation of the resisting couple, developed upon its axis under various conditions of load and current lead and lag in the alternator, not only will this exciter turn synchronously with the alternator which it supplies, but the respective connections of their axes remain as invariable as if they were connected by the intermediary of a train of gearing. It remains that nothing is changed in the operation of the exciter, even although the mechanical connection between it and the alternator which it supplies is suppressed.

While we have spoken of certain fields as "fixed" and others as "movable," it is to be understood that this has been done for convenience of description and that, as is well known, the circuit arrangements may be so changed that the fixed and movable parts become interchanged.

Figure 2:
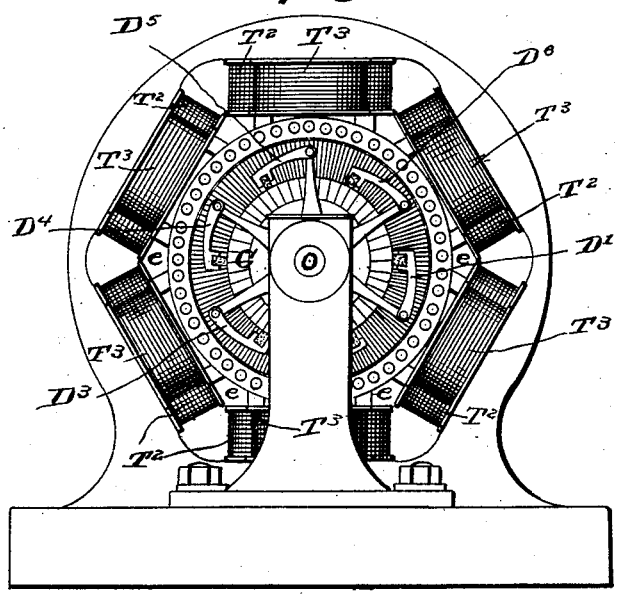
Figure 3:
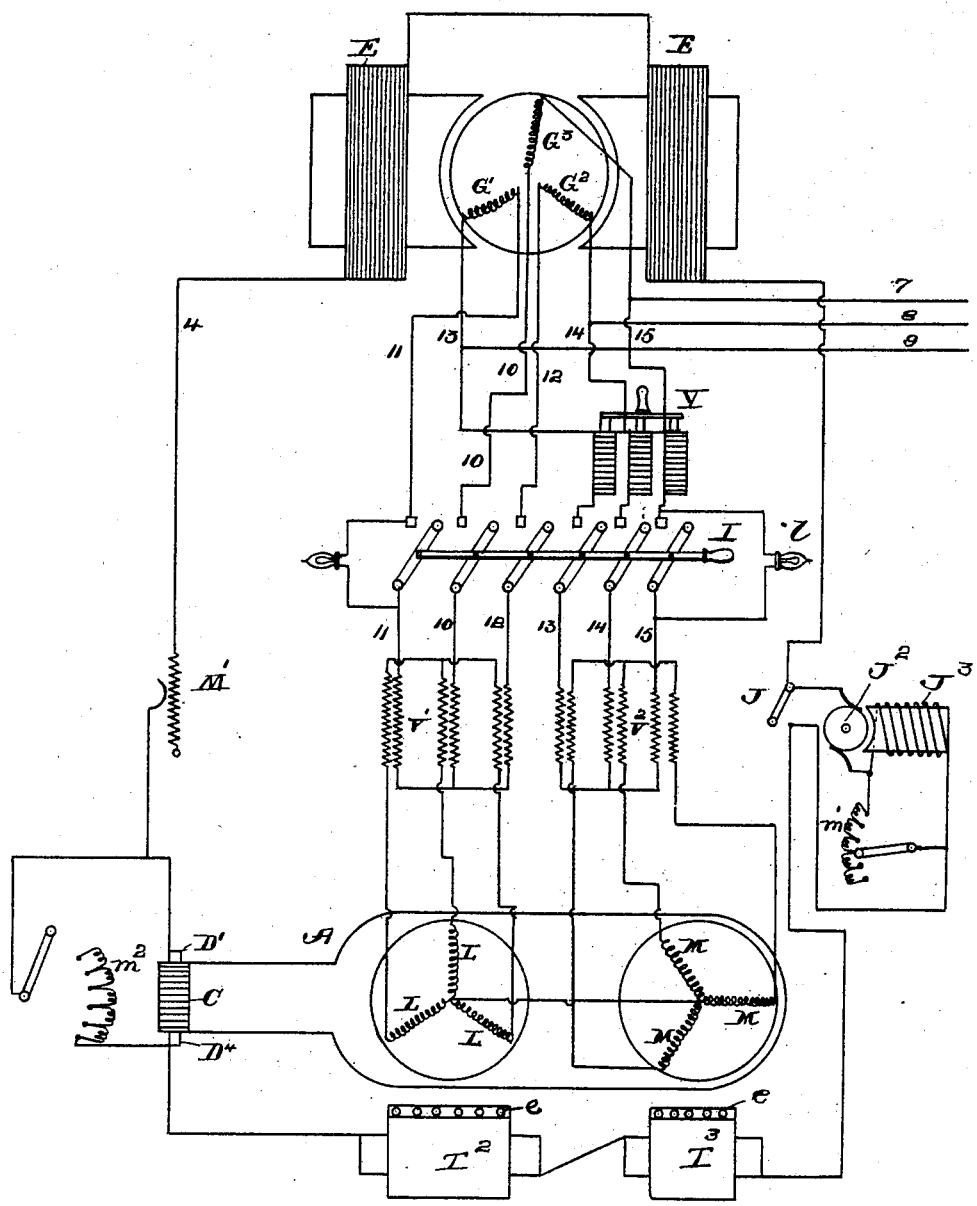
Figure 4:
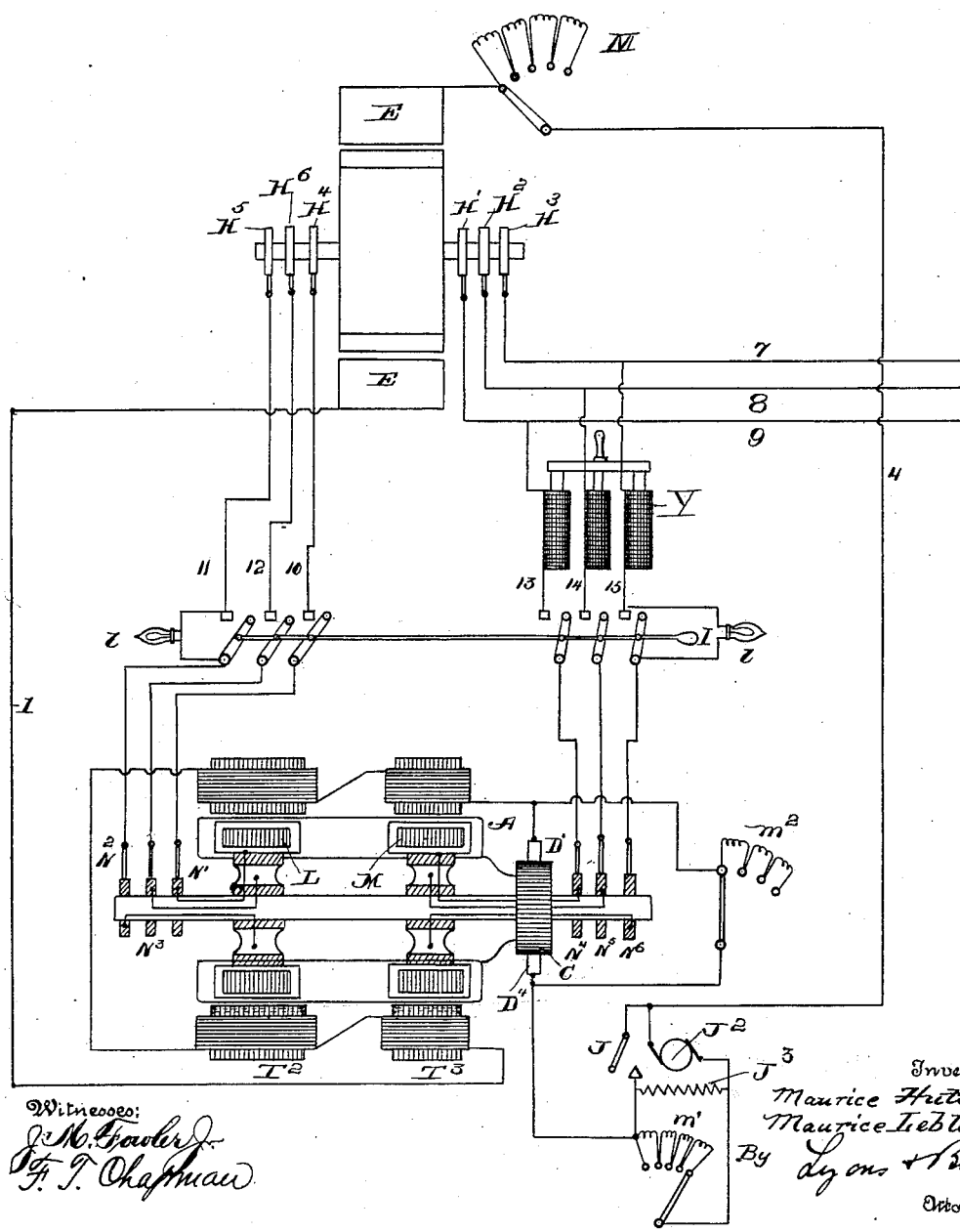

In the drawings, Figure 1 is a central section of our improved exciter. Fig. 2 is an end elevation thereof. Fig. 3 is a diagram of the circuit connections of the exciter and alternator. Fig. 4 is another diagram of the same. Fig. 5 is a diagram of the alternator connections, and Fig. 6 is a diagram of an equivalent type of alternator.

We have used, so far as it has been possible, the same letters and figures of reference on the present drawings as were used in our prior patent. It becomes, then, a comparatively-easy matter to understand our improvement from the present illustration. Taking, for instance, Fig. 4, we find the rotary part of the exciter carrying the multiphase field-winding L and the multiphase field-winding M. Multiphase taps from these windings are taken to rings $N' N^2 N^3$ and $N^4 N^5 N^6$, respectively. There is an armature-winding of the continuous-current type A, which has its sections tapped to the commutator C, on which bear brushes $D' D^2$ to $D^6$. There is a field-winding $T^2$ acting in conjunction with the movable field-winding L and another field-winding $T^3$ acting in conjunction with the movable field-winding M. The field-windings $T^2$ and $T^3$ are in series with each other and also in series with a pair of brushes $D' D^4$, which in turn are mounted in series with the field-winding E of the alternator. From the brushes which bear upon the rings $N' N^2$ to $N^6$ lead wires 10 11 12 and 13 14 15, respectively. We may, for the purpose of properly reducing the tension, insert a transformer $V'$ in one set of these wires and a transformer $V^2$ in the other set of wires, as is indicated in Fig. 3. We also insert a switch in each wire and operate the set of switches by the common bar or handle I. Lamps $l$ or indicating devices are placed in shunt of one each of these switches to show whether the phases of the currents coincide. For the purpose of compensating for any slight or accidental lack of regulation we employ an impedance-coil Y in the wires 13, 14, and 15 and a rheostat $M'$ in the wire 4, which is in series with the alternator-field.

We note that the inductors or field-windings $T^2 T^3$ are constructed in the ordinary fashion and are shown in Fig. 2 to have six poles. Their bobbins have respectively the same number of turns, but the core of the winding $T^3$ is smaller in section than that of the winding $T^2$. This permits us to give different permeabilities to the magnetic circuits of the winding $T^2 T^3$, and thus to determine that the smaller core shall first become saturated. We note, further, as is apparent from Fig. 3, that the field-windings L are dephased ninety degrees with reference to the field-windings M. We also use a magnetic screen in the form of a squirrel-cage $e$, arranged within the magnetic field of the exciter. The presence of this magnetic screen has the effect of insuring the synchronous movement of the exciter and permits us to employ the same framework of the machine whether it is desired to excite an alternator for single-phase currents or an alternator for polyphase currents. The position of the brush-carrier about the commutator is assumed to be adjustable.

It is seen from what has been said that we have reproduced substantially the system shown in our prior patent, with certain additions. The armature-coils $G'$, $G^2$, and $G^3$ supply alternating current to the field-windings L M of the alternator, the field L being in series with the circuits of the alternator-armature and the field-circuits M being in shunt relation to the armature-circuits of the alternator, or, what is the same thing, in shunt with the network 7 8 9 of the system. The field-windings L M are not only dephased with relation to each other, but are so wound as to produce the proper vector summation of electromotive forces, one of which is proportional to the load and the other to the pressure at the machine-terminals or at any other desired point on the line.

In case the alternator is running in synchronism with other alternators of the system, a continuous current will be supplied to its fields E from the brushes $D' D^4$ which will be exactly of the intensity required to produce perfect excitation. This same current also traverses the field-windings $T^2 T^3$ of the exciter and there acts to produce a flux which exactly compensates for the armature reactions of the exciter, and another flux, at ninety degrees therefrom, which acts to drive the armature. In case but a single field-winding $T^2 T^3$ is used on the exciter it is seen that if the brushes on the commutator are set equidistant from adjacent poles none of the flux developed by these poles will be available for neutralizing armature reaction or opposing the magnetomotive force of the secondary armature-winding. On the contrary, if the brushes be set with a displacement of ninety magnetic degrees or opposite field-pole centers all of the magnetic flux engendered by these poles will be available for suppressing armature reaction or canceling the magnetic flux due to the secondary armature-currents, although such poles would at the same time be rendered unavailable for driving purposes. At some point between these two positions we have discovered and proved by an exhaustive calculation there is a position of the brushes which gives the desired combination of a component magnetomotive force neutralizing armature reaction, together with a component magnetomotive force for driving the armature. The same effect might be produced by having brushes set midway between the poles and auxiliary field-coils, midway between those shown, said auxiliary field-coils being charged with the sole duty of neutralizing the secondary-armature magnetomotive force. Such an arrangement, however, would naturally be inferior, both mechanically and electrically, to that described in the preceding paragraph. In case a single field-winding is used, the two fluxes, one of which neutralizes the armature reaction and the other of which acts to drive, may be considered as the components in lines at right angles to each other of a single flux. The remarkable thing which we have proved is that if the brushes are fixed once for all so that there shall be no sparking upon the commutator then the correct position of the brushes has been attained and will remain attained during the entire operation of the system under all of its varying conditions. Should the alternator not be running in synchronism with the other alternators of the system, then the brushes $D'$ $D^4$, instead of supplying a continuous current to the alternator-field E, will supply a slowly-alternating current thereto having a frequency equal to the slip, the effect of which will be to supply alternating currents of the proper frequency to the exciter-fields L M, so as to keep the parts in step. This has all been so fully described in our prior patent that it would be a mere repetition to state the same thing again in this place.

It is to be understood that the slip-rings and brushes in the respective movable circuits of the alternator and exciter have not been shown in Fig. 3, although they have been shown in Fig. 4.

In order to more fully disclose the armature-winding of the alternator, we have added Fig. 5, in which the wires 10 11 12 13 14 15 are shown as leading to brushes $H'$ $H^2$ $H^3$ $H^4$ $H^5$ $H^6$, and thus in turn to the terminals of the armature-coils $G'$ $G^2$ $G^3$. In Fig. 6 we have shown the armature-circuits to which the wires 10 11 12, &c., lead as fixed and the field-circuit E to which the wires 1 4 lead as movable.

In order to start the system, we use a continuous-current machine $J^2$, having its field $J^3$ in series with the armature thereof and having a resistance $m'$ in shunt about this armature. This continuous-current machine $J^2$ should be capable of exciting the alternator when it has nothing to do but to drag along, its exciter operating as a synchronous motor. The continuous-current machine $J^2$ may then be of very small dimensions, and as it need only be used at the moment of starting a single machine may serve for all the alternators at the central station. It is seen that this continuous-current machine, which we call the "provisional exciter," is mounted in series with the field of the alternator.

In order to start the system, we first open the switch I. We then excite the alternator with continuous currents from the provisional exciter. At the same time the exciter-field is fed with continuous currents. The alternator-armature is gradually brought up to speed. The exciter, which now acts like a constant-current motor, is also brought up to speed by manipulating the rheostat $m^2$ in shunt about its brushes. Any lack of correspondence in synchronism between the alternator and exciter is shown by the lamps $l$ $l$. When synchronism, as shown by these lamps, has been attained, the switches I are closed, and the exciter will continue to turn in synchronism with the alternator. One then gradually suppresses the shunt about the brushes of the exciter and at the same time places in short-circuit the field-winding $J^3$ of the continuous-current machine. These two operations having been simultaneously effected, the provisional exciter is completely short-circuited by the switch J and is thus eliminated from the system.

We have fully described in our prior patent the difference which exists between the synchronous and asynchronous types of alternators. Manifestly the same remarks might be made at this point. If the exciter of this application should be used to supply asynchronous alternators, we should have to replace its continuous-current field by the field of a rotary-field machine having as many circuits as the alternator has inducing-circuits. In starting we should provisionally transfer the asynchronous alternator into an ordinary alternator. We would speed up the alternator and exciter by sending continuous current from the provisional exciter into a single one of the field-circuits of the alternator and through a single circuit traversing a pair of brushes resting on the commutator of the exciter—that is, we should start the asynchronous machine by converting it for the moment into a synchronous machine.

In order to provide for any accidental or minute departure from perfect regulation, we should in the case of such a synchronous alternator employ as many rheostats $M'$ as the alternator carries inducing-circuits, and we should make these rheostats simultaneously movable.

It will be seen in this application, as was true in our patent, that the currents of the two fields of the exciter L M make a vector angle equal to the complement of the angle of lag, and that the electromotive forces produced by these fields are respectively proportional to the load and to the pressure at any desired point of the line. It is also evident that one exciter-field is practically constant in magnitude and phase, and the other varies in magnitude and phase with the current in the alternator-armature, as in our prior patent. Putting this in a different way, it is seen that the regulation of the exciting-current is accomplished by the series winding L and shunt-winding M and the fluxes produced thereby. The magnitude of these fluxes under any particular conditions of voltage and load may be fixed by suitably proportioning the windings, as explained in our patent, while the phase difference which is to normally exist between them may be determined by properly making the connections from the ring $N'$ $N^2$ to $N^6$ to the coils L M. The angle between the two magnetic fluxes, due to the shunt and series field windings, respectively, of the exciter must be the complement of the angle of lag. Consequently normally when the angle of lag is zero the angle between the fluxes must be ninety degrees, and one way of accomplishing this is by tapping the shunt-winding M at points which are ninety degrees from the tapping-point of the series winding L. If now two alternating currents which are in phase with each other traverse the series and shunt windings, respectively, we may for convenience in drafting our claims speak of this as the normal condition. The two fluxes produced by them, whether rotary or not, will be in quadrature, so that the electromotive forces which produce them may be said to be normally acting in quadrature. If the series current lags, the angle between the two fluxes will be less than ninety degrees, but always equal to the complement of the lag. The circuits are designed as in our prior patent, No. 630,233, so that the vector summation, both as to its angle and as to its magnitude, shall be proper in amount for perfect excitation. It is also true in this application, as in our prior patent, that our exciter may be looked upon as a rotary transformer receiving alternating current into its field-windings L M and delivering constant or slowly-alternating currents into the circuits leading from the brushes resting on its commutator.

What we claim is—

1. An exciter for an alternating-current machine having its field magnetism supplied by two relatively-moving elements, the one having dephased alternating excitation, the other, in the armature-circuit of the exciter, producing a driving-flux and a flux compensating for armature reactions, substantially as described.

2. An exciter for an alternating-current machine having its field magnetism supplied by two relatively-moving elements, the one having dephased multiphase excitation, the other, in the armature-circuit of the exciter, producing a driving-flux and a flux compensating for armature reaction, substantially as described.

3. An exciter for an alternating-current machine having a pair of normally-dephased alternating-current field-windings, a driving-field winding and an armature-winding subject to the conjoint influence of the three fields, substantially as described.

4. An exciter for an alternating-current machine having its field magnetism supplied by two relatively-moving elements, the one having dephased alternating-current excitation producing a vector summation of electromotive forces proportional to the load and to the pressure at the machine-terminals respectively, the other in the armature-circuit of the exciter producing a driving-flux, substantially as described.

5. An exciter for an alternating-current machine having its field magnetism supplied by two relatively-moving elements, the one having dephased alternating-current excitation producing a vector summation of electromotive forces proportional to the load and to the pressure at the machine-terminals respectively, the other in the armature-circuit of the exciter producing both a driving-flux and a flux compensating for armature reaction, substantially as described.

6. An exciter for an alternating-current machine having a pair of dephased alternating-current field-windings, a driving and armature-reaction-compensating field winding and an armature-winding subject to the conjoint influence of the three fields, substantially as described.

7. An exciter for an alternating-current machine having a pair of dephased, multiphased, alternating-current field windings, a driving-field winding and an armature-winding subject to the conjoint influence of the three fields, substantially as described.

8. An exciter for an alternating-current machine having a pair of dephased, multiphased, alternating-current field-windings, a driving and compensating field winding and an armature-winding subject to the conjoint influence of the three fields, substantially as described.

9. An exciter for an alternating-current machine supplied by two relatively-moving elements, the one having dephased, multiphase, alternating-current excitation producing a vector summation of electromotive forces proportional to the load and to the pressure at the machine-terminals respectively, the other in the armature-circuit of the exciter producing a driving-flux, substantially as described.

10. An exciter for an alternating-current machine having its field magnetism supplied by two relatively-moving elements, the one having dephased multiphase alternating-current excitation producing a vector summation of electromotive forces proportional to the load and pressure at the machine-terminals respectively, the other in the armature-circuit of the exciter producing both a driving-flux and a flux compensating for armature reactions respectively, substantially as described.

11. The combination with an alternating-current machine and an exciter mechanically disconnected therefrom which of its own accord runs in synchronism therewith, the exciter having three independent field-circuits, the windings of one of which are in series with the armature of the alternator, the windings of another being in shunt therefrom, and the windings of the third producing a driving-flux, substantially as described.

12. The combination with an alternating-current machine of an exciter mechanically disconnected therefrom which of its own accord runs in synchronism therewith, the exciter having three independent fields produced by independent field-circuits, one of which is practically constant, the other is variable with the currents in the armature of the alternator and the third of which produces a driving-flux, substantially as described.

13. The combination of an alternating-current machine and an exciter therefor comprising a series and a shunt coil, a generating-coil in inductive relation with both and a driving-field and armature-reaction compensating coil, substantially as described.

14. The combination of an alternator and an exciter therefor comprising three independent fields, one field being practically constant in magnitude and phase, the other varying in magnitude and phase with a current in the alternator-armature, the third producing a driving-flux, and a generator-winding within the inductive influence of all three fields, substantially as described.

15. The combination of an alternating-current machine and an exciter therefor comprising a series and a shunt coil, a generating-coil in inductive relation with both and a coil producing a driving-field and compensating for armature reaction, substantially as described.

16. The combination of an alternating-current machine and an exciter therefor comprising a multiphase series coil, a multiphase shunt-coil, a generating-coil in inductive relation with both and a driving-field coil, substantially as described.

17. The combination of an alternator and an exciter therefor comprising three independent fields, each produced by multiphase current, one field being practically constant in magnitude and phase, the other varying in magnitude and phase with a current in the alternator-armature, the third producing a driving-flux, and a generating-winding within the inductive influence of all three fields, substantially as described.

18. The combination of an alternating-current machine comprising a multiphase series coil and a multiphase shunt-coil, a generating-coil in inductive relation with both and a coil producing a driving-field, substantially as described.

19. A rotary transformer comprising two primary windings each on a separate magnetic circuit, a secondary winding common to both and connected to a commutator and brushes, and a driving-field for rotating the windings, substantially as described.

20. A rotary transformer comprising two primary windings each on a separate magnetic circuit, a secondary winding common to both and connected to a commutator and brushes, and a driving-field in series with the brushes for rotating the winding, substantially as described.

21. An exciter for an alternating-current dynamo-machine comprising in combination means for creating a rotary field of constant magnitude, means for creating a rotary field varying in magnitude and phase with the variations in volume and current supplied by the alternator, a generating-winding in the inductive influence of both fields and a driving-field winding, substantially as described.

22. The combination of an alternator and an exciter therefor comprising in combination means for creating a rotary field of constant magnitude, means for creating a rotary field varying in magnitude and phase with a variation of the current supplied by the alternator, a generating-winding in the inductive influence of both fields, and a winding producing a driving-field and compensating for armature reactions, substantially as described.

23. The combination of an alternator and an exciter therefor mechanically disconnected therefrom but of its own accord running in synchronism therewith, comprising in combination means for creating a rotary field of constant magnitude, means for creating a rotary field varying in magnitude and phase with the variation of the current supplied by the alternator, and a winding producing a driving-field.

24. The combination of an alternator and an exciter therefor mechanically disconnected therefrom but of its own accord running in synchronism therewith, comprising in combination means for creating a rotary field of constant magnitude, means for creating a rotary field varying in magnitude and phase with the variation of the current supplied by the alternator, a generating-winding in inductive influence of both fields, and a winding producing a driving-field, substantially as described.

25. The combination of an alternator, an exciter therefor and a provisional constant-current exciter in series with the fields of the alternator and exciter, substantially as described.

26. The combination of an alternator, an exciter therefor and a provisional constant-current series-wound exciter therefor in series with the fields of the alternator and exciter, substantially as described.

28. The combination of an alternator, an exciter therefor and a provisional series-wound exciter having its field-winding shunted by a rheostat, the provisional exciter being in series with the fields of the alternator and exciter, substantially as described.

28. The combination of an alternator and an exciter therefor having field-circuits supplied by the alternator-armature, an exciter-field circuit in series with the alternator-field and a set of simultaneously-moving switches in the circuits leading from the alternator-armature to the exciter-fields, substantially as described.

29. The combination of an alternator and exciter therefor having field-circuits supplied by the alternator-armature, an exciter-field circuit in circuit with the alternator-field, a set of simultaneously-moving switches in the circuits leading from the alternator-armature to the exciter-field and indicating devices in shunt of the switches, substantially as described.

30. The combination of an alternator, an exciter therefor having a field-circuit in series with brushes resting on the commutator of the exciter, a rheostat shunting these brushes and a provisional constant-current exciter in series with the fields of the alternator and exciter, substantially as described.

31. The combination of an alternator, an exciter therefor having a field-circuit in series with brushes resting on the commutator of the exciter, a rheostat shunting these brushes, a set of switches in the circuits leading from the alternator-armature to the exciter-fields and a provisional constant-current exciter in series with the field of the alternator and a field of the exciter, substantially as described.

32. An exciter for an alternating-current machine supplied by two relatively-moving elements, the one having dephased, alternating-current excitation producing a vector summation of magnetomotive force, normally at an angle, proportional to the load and to the pressure at the machine-terminals respectively, the other in the armature-circuit of the exciter producing a driving-flux, substantially as described.

33. An exciter for an alternating-current dynamo-machine comprising means for creating a rotary field of constant magnitude, means for creating a rotary field, normally at an angle to that last specified, varying in magnitude and phase with the variations in volume and current supplied by the alternator, a generating-winding in the inductive influence of both fields and a driving-field winding, substantially as described.

34. An exciter comprising two associated rotary-field primary windings, a secondary winding common to both, the three forming a mechanically-connected system, and a fourth winding in relative rotation thereto, which serves to cancel the magnetomotive force of the secondary winding and to supply determinate poles to maintain the apparatus in motion, substantially as described.

35. The combination of an alternator and an exciter therefor, mechanically disconnected therefrom but rotating in synchronism therewith, comprising a field constant in magnitude and phase, a field normally at an angle thereto varying in magnitude and phase with a current in the alternator-armature and a driving-field, substantially as described.

36. The combination of an alternator and an exciter mechanically disconnected therefrom but running in synchronism therewith, having means for producing fields normally at an angle, means for producing a driving-field and an armature-winding subject to the conjoint influence of the three fields for supplying the alternator, substantially as described.

37. The combination with an alternating-current machine and an exciter mechanically disconnected therefrom which of its own accord runs in synchronism therewith, the exciter having means for producing a field of constant magnitude and phase, means for producing a field normally at an angle to that specified varying in magnitude and phase with a current in the alternator-armature and means for producing a driving-field, substantially as described.

38. The combination with an alternating-current machine and an exciter mechanically disconnected therefrom which of its own accord runs in synchronism therewith, the exciter having means for producing a field of constant magnitude and phase, means for producing a field normally at an angle to that specified varying in magnitude and phase with a current in the alternator-armature and means producing a driving-field and compensating for armature reaction.

39. The combination of an alternator and an exciter mechanically disconnected therefrom but running in synchronism therewith, which exciter delivers to the field-winding of the alternator currents derived from the vector sum of electromotive forces normally acting at an angle, one of which is proportional to the current in the armature of the alternator and the other to the pressure at a predetermined point in the external circuit and means for producing a driving-flux for the exciter, substantially as described.

40. The combination of an alternator and an exciter mechanically disconnected therefrom but running in synchronism therewith, which exciter delivers to the field-winding of the alternator currents derived from the vector sum of electromotive forces normally acting at an angle, one of which is proportional to the current in the armature of the alternator and the other to the pressure at a predetermined point in the external circuit and means for producing a driving-flux for the exciter and for compensating for armature reaction, substantially as described.

41. The combination of an alternator and an exciter mechanically disconnected therefrom but running in synchronism therewith, having means for producing fields normally at an angle, means for producing a driving-field, and an armature-winding subject to the conjoint influence of the three fields for supplying the alternator, and means for neutralizing the armature reaction, substantially as described.

42. An exciter for an alternating-current machine having its field magnetism supplied by two relatively-moving elements, the one having means for producing fields normally at an angle, the other, in the armature-circuit of the exciter producing a driving-flux, substantially as described.

43. An exciter for an alternating-current machine having its field magnetism supplied by two relatively-moving elements, the one having multiphase excitation produced by the vector summation of magnetomotive forces normally at an angle, the other, in the armature-circuit of the exciter, producing a driving-flux, substantially as described.

44. An exciter comprising two associated primary windings, an armature-winding connected to a commutator common to both, the three forming a mechanically-connected system, and a fourth winding in relative rotation thereto which, by the adjustment of the brushes on the commutator, serves to cancel the magnetomotive force of the secondary winding and to supply determinate poles to maintain the apparatus in motion, substantially as described.

45. The combination of an alternator and an exciter therefor mechanically disconnected therefrom but rotating synchronously therewith, said exciter comprising two associated primary windings, an armature-winding connected to a commutator common to both, the three forming a mechanically-connected system, and a fourth winding in relative rotation thereto which, by the adjustment of the brushes on the commutator, serves to cancel the magnetomotive force of the secondary winding and to supply determinate poles to maintain the apparatus in motion, substantially as described.

46. The combination of an alternator and an exciter, said exciter having a field varying with the armature-current, a field normally at an angle thereto varying with the pressure at a predetermined point of the system, an armature-winding connected to a commutator, and a single field-winding which, by the adjustment of the commutator-brushes, supplies component fluxes to drive the armature and to neutralize the armature reactions, substantially as described.

In testimony whereof we have signed our names to this specification in the presence of the subscribing witnesses.

MAURICE HUTIN.
MAURICE LEBLANC.

Witnesses as to Maurice Hutin:
  X. BOYAN,
  HENRY J. WEHLE.

Witnesses as to Maurice Leblanc:
  EDWARD P. MACLEAN,
  ALBERT DELAS.